United States Patent [19]
Neri

[11] Patent Number: 5,127,737
[45] Date of Patent: Jul. 7, 1992

[54] CIGARETTE END GROUP INSPECTION SYSTEM

[75] Inventor: Armando Neri, Bologna, Italy

[73] Assignee: G. D. Societa' Per Azioni, Italy

[21] Appl. No.: 465,388

[22] Filed: Jan. 12, 1990

[30] Foreign Application Priority Data

Jan. 13, 1989 [IT] Italy .................................. 3307 A/89

[51] Int. Cl.$^5$ ..................... G01B 11/00; B07C 5/00
[52] U.S. Cl. ................................ 356/394; 356/237; 356/398; 209/535
[58] Field of Search .............. 356/394, 388, 398, 392, 356/237; 209/535, 536; 250/223 R, 223 B

[56] References Cited

U.S. PATENT DOCUMENTS

| | | | |
|---|---|---|---|
| 3,473,037 | 10/1969 | Schmermund | 250/223 R |
| 4,006,296 | 2/1977 | Peterson | 356/394 |
| 4,486,098 | 12/1984 | Buchegger et al. | 250/223 R |
| 4,579,455 | 4/1986 | Levy et al. | 356/398 |
| 4,644,150 | 2/1987 | Kuga et al. | 356/237 |
| 4,760,853 | 8/1988 | Gamberini | 209/535 |
| 4,976,544 | 12/1990 | Neri | 356/237 |

*Primary Examiner*—Richard A. Rosenberger
*Assistant Examiner*—Hoa Pham
*Attorney, Agent, or Firm*—Gifford, Groh, Sprinkle, Patmore and Anderson

[57] ABSTRACT

A system for inspecting the ends of cigarettes prior to their packaging on a conveyor line. The system provides telecamera units which produce images of the ends of a group of cigarettes. A processing unit then analyses the brightness level of a given area on each cigarette end. The processing unit then counts the total number of areas having a brightness level within a given range and compares that number with that of a reference end image for determining the existence of defects. An expulsion unit is further provided for rejecting those groups of cigarettes which fall below the requirements of the reference end image.

12 Claims, 5 Drawing Sheets

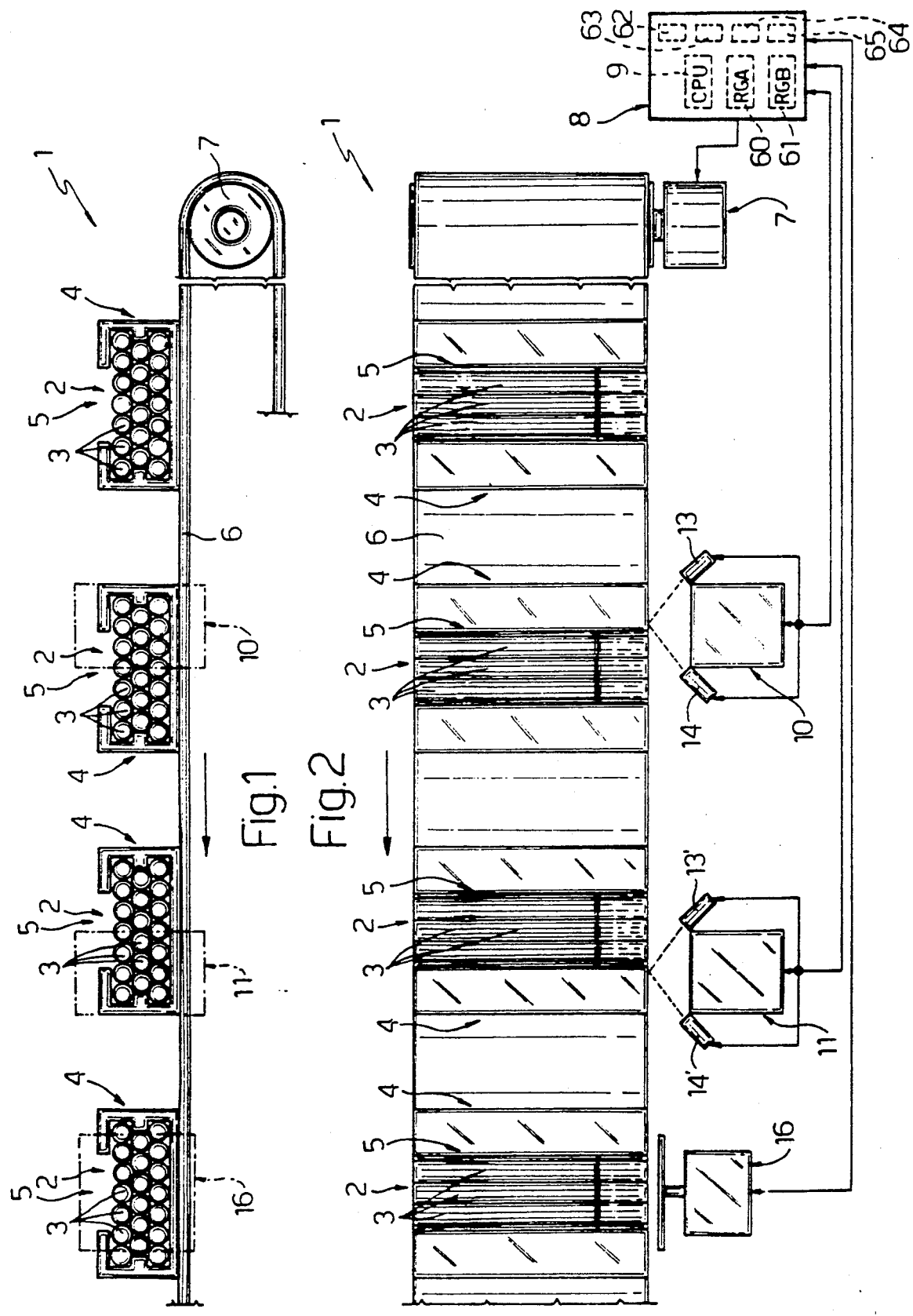

CIGARETTE END GROUP INSPECTION SYSTEM

BACKGROUND OF THE INVENTION

The present invention relates to a system for inspecting the ends of cigarettes, particularly, though not exclusively, those wherein the filter presents a surface pattern generally determined by a number of longitudinal suction channels, e.g. of the type described in European Patent Application No 212.234.

Said cigarettes are conveniently fed on to the wrapping line of a packing machine in groups housed inside compartments on a jog feed loop conveyor. Provision must therefore be made for ensuring said groups are complete, and contain no faulty cigarettes, particularly as regards said surface pattern of the filter.

Standard end inspection systems featuring electromechanical or photocell devices fail to provide for accurately determining conformance of said end pattern with a given reference pattern.

SUMMARY OF THE INVENTION

The aim of the present invention is to provide a system for inspecting the ends of cigarettes, particularly in groups of the aforementioned type, and enabling a given end configuration to be determined in a relatively straightforward and sufficiently reliable manner.

With this aim in view, according to the present invention, there is provided a cigarette end inspection system, characterized by the fact that it comprises first means for viewing and producing an image of at least said end surface; second means for analyzing the brightness levels of portions of said image; and third means for comparing the results of said second means with predetermined values, and so producing a signal for enabling or not fourth means whereby at least said cigarette is rejected.

BRIEF DESCRIPTION OF THE DRAWINGS

A preferred, non-limiting embodiment of the present invention will be described by way of example with reference to the accompanying drawings, in which:

FIG. 1 shows a schematic front view of a device for transferring and inspecting groups of cigarettes according to the teachings of the present invention;

FIG. 2 shows a schematic top view of the FIG. 1 device;

DETAILED DESCRIPTION OF THE INVENTION

Figure 3:
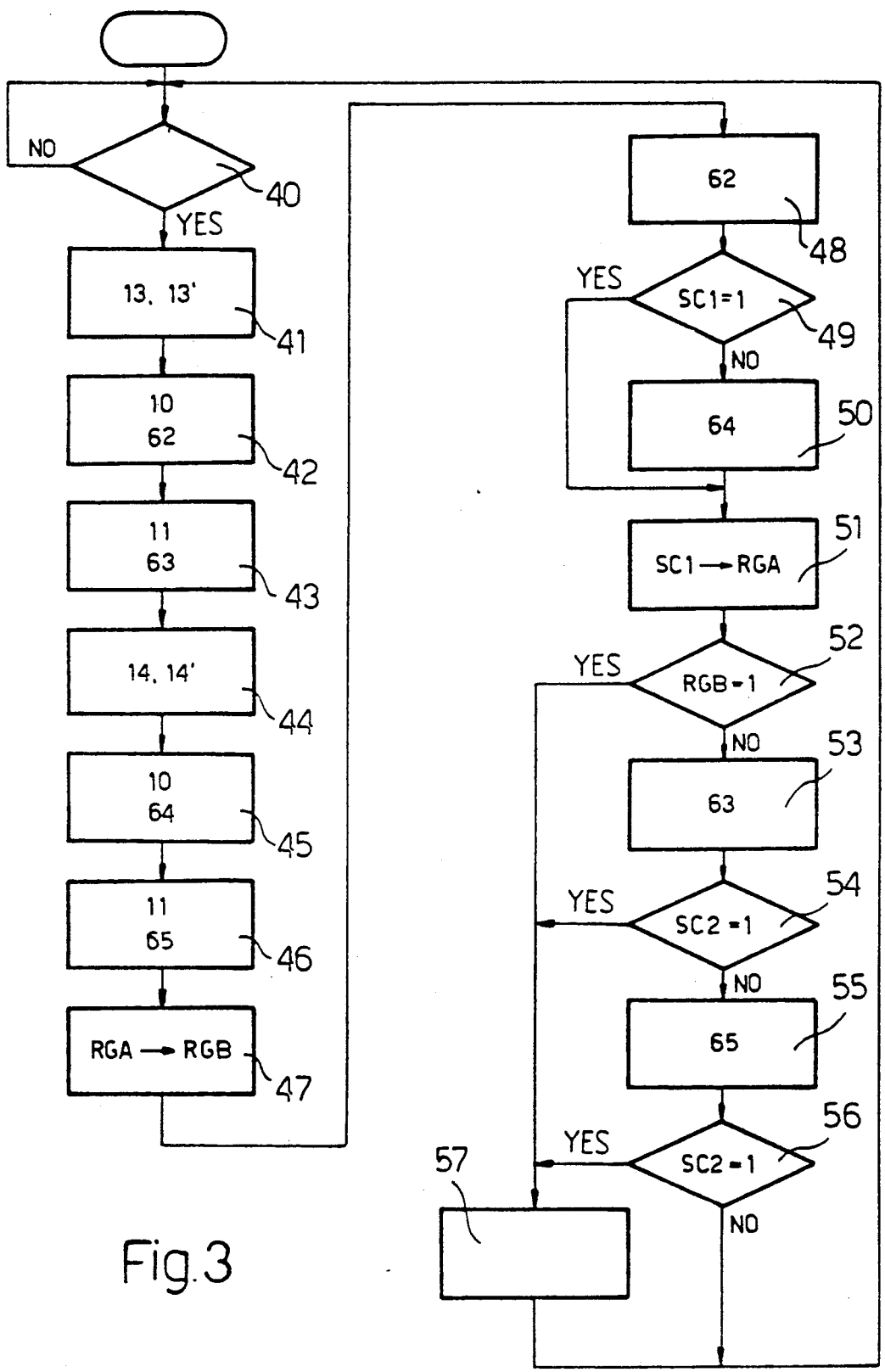
FIG. 3 shows a block diagram of the control unit on the system according to the present invention, and applied to the FIG. 1 and 2 device.

Number 1 in FIGS. 1 and 2 indicates a device for transferring and inspecting groups 2 of cigarettes 3, said groups 2 being housed in parallelepiped compartments 4 having a longitudinal top opening 5. Said compartments 4 are fitted on a loop conveyor 6 powered intermittently and in known manner by an end drive roller 7 controlled by an electronic control system 8 forming part of device 1 and conveniently comprising a central processing unit (CPU) 9. Each group 2 comprises twenty cigarettes 3 arranged in three superimposed layers of seven, six and seven cigarettes respectively. FIGS. 1 and 2 show a number of compartments 4, the center distance of which is conveniently equal to one step of belt 6.

Along the route travelled by compartments 4, provision is made for two telecamera units 10 and 11, one facing the right half of a first compartment 4 in the stop position, and the other facing the left half of the adjacent compartment 4 in the travelling direction of belt 6. Each telecamera unit 10 and 11 presents two conveniently optical-fibre lighting units positioned to the right and left, facing the central viewing area, and respectively numbered 13 and 14 for unit 10 and 13' and 14' for unit 11.

Both telecamera units 10 and 11 and lighting units 13, 14, 13' and 14' are controlled by electronic control system 8.

Device 1 also comprises a substantially known type of expulsion unit 16, e.g. a piston-operated plate, controlled by electronic control system 8 and located facing compartment 4 in the next stop position to that facing telecamera unit 11.

The inspection system according to the present invention operates as follows.

As group 2 of cigarettes 3 travels along belt 6, telecamera units 10 and 11 produce an image of the cigarette ends in the group, which image is analyzed by processing unit 9 of control system 8, for determining the brightness level of each elementary area (pixel) of each cigarette end. Processing unit 9 then counts the number of pixels having a brightness level within a given range (which amounts to quantifying the close to black, white or grey portions of the image), which number is compared with that of a reference end image for determining any defects in the configuration of each cigarette end and so enabling rejection of unit 2 containing the defective cigarette 3. For improving the definition of said image, in the embodiment shown, the complete image of each group 2 of cigarettes 3 is produced by two telecamera units 10 and 11 for respectively viewing first the right half and then the left half of group 2. At each step of belt 6, therefore:

telecamera unit 10 produces an image of the right half of group 2 housed inside compartment 4 arrested with its right-hand portion facing unit 10;

telecamera unit 11 produces an image of the left half of group 2 housed inside compartment 4 arrested with its left-hand portion facing unit 11 and downstream from said compartment 4 arrested facing unit 10;

processing unit 9 of control system 8 then analyzed the complete image of the ends of cigarettes 3 in group 2 housed inside compartment 4 facing unit 11, the characteristics of the right-hand half of said image having been memorised at the foregoing stage when said compartment was arrested facing unit 10;

should even only one of the ends of cigarettes 3 in group 2 prove defective, processing unit 9 of control system 8 enables expulsion unit 16 for rejecting said group 2 housed in compartment 4 facing unit 11, when this is moved forward and arrested facing expulsion unit 16.

To improve the image of the ends of cigarettes 3 in group 2, at each step of conveyor 6, i.e. each time compartments 4 are arrested facing telecamera units 10 and 11, electronic control system 8 first enables lighting units 13 and 13' for lighting the respective portion of group 2 from the right-hand side, after which, it enables lighting units 14 and 14' for doing the same on the left-hand side. Both the resulting images are then analyzed by processing unit 9 as described in detail later on.

Figure 5A:
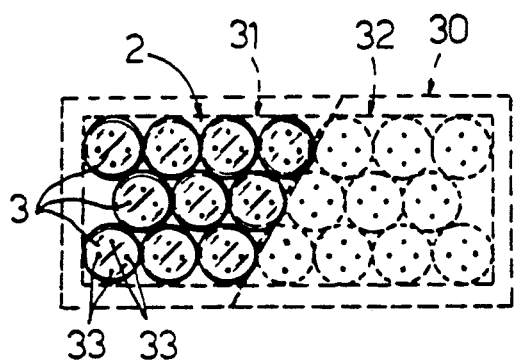
FIG. 5a shows a schematic front view of the cigarette ends in each group.

FIG. 5a shows a complete image 30 of the ends of cigarettes 3 in a group 2 of twenty cigarettes housed inside compartment 4. The continuous line indicates the left-hand portion 31 consisting of ten cigarettes (three in the bottom and middle layers and four in the top layer) produced by telecamera unit 11, and the dotted line the right-hand portion 32 also consisting of ten cigarettes (three in the top and middle layers and four in the bottom layer) produced by telecamera unit 10. Said cigarettes 3 may be of the type described in European Patent Application No. 212.234, and present filters having four equally-spaced longitudinal suction channels 33 of relatively small diameter.

Figure 5B:
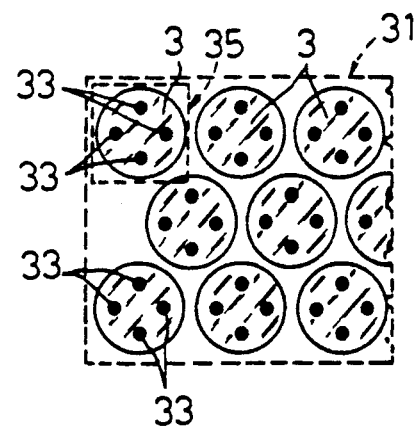
FIG. 5b shows an enlarged schematic front view of part of the FIG. 5a group.

FIG. 5b shows an enlargement of part of image portion 31, wherein 35 indicates the area defining the end of one cigarette 3 and on which processing unit 9 operates within said portion 31. Of said area 35, which is conveniently 47×47 pixel in size, processing unit 9 determines the brightness level of the various pixels, which may conveniently be any one of 64 values ranging from black to white: the pixels corresponding to longitudinal channels 33 present a brightness level close to black; those corresponding to the solid portion of the end of cigarette 3 present a brightness level close to grey; and those corresponding to the background portion surrounding cigarette 3 present a brightness level close to white. For each of said 64 brightness values, therefore, processing unit 9 counts the number of pixels in said area 35, which are plotted (continuous curve 36 in FIG. 7) to show the number of brightness levels (Y axis) and distribution of the same from black to white (left to right on the X axis).

Figure 7:
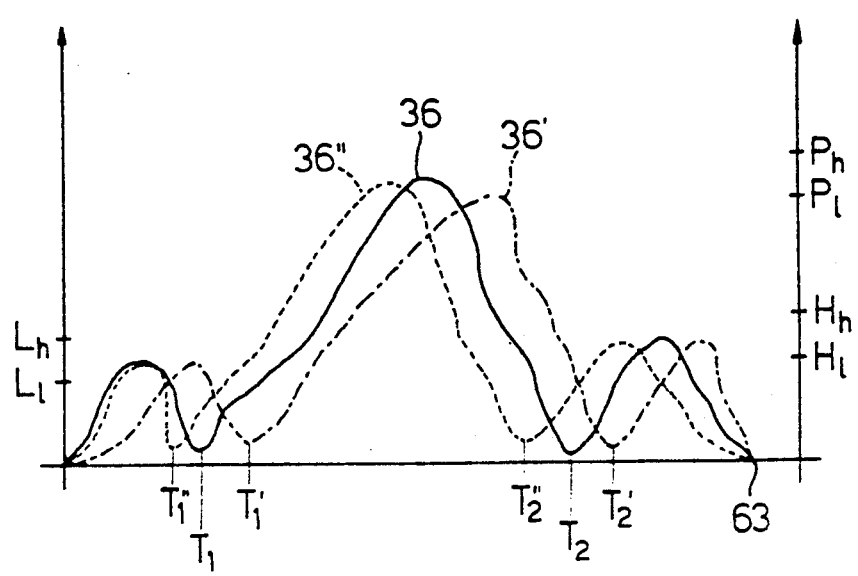
FIG. 7 shows processing curves produced by the control unit on the system according to the present invention.

As shown in FIG. 7, said curve 36 presents three peaks corresponding respectively (from left to right) to the maximum number of near-black, grey, and near-white pixels; and two intermediate dips T1 and T2 respectively separating the near-black and grey and the grey and near-white pixel portions.

Figure 6A:
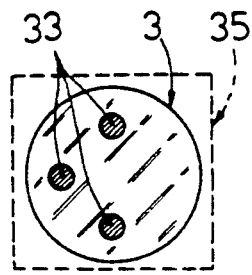
FIGS. 6a and 6b show enlarged schematic front views of defective cigarette ends.
Figure 6B:
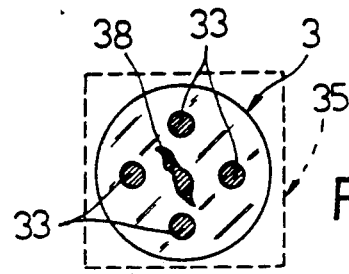

Alongside an increase or reduction in overall illumination of the image, said curve 36 shifts along the X axis to the right and left respectively to give respective curves 36' and 36''. As in the case of curve 36, both curves 36' and 36'' present intermediate dips (T1', T2' and T1'', T2'') respectively separating the near-black and grey and the grey and near-white pixel portions. Indeed, pixel distribution between said portions is maintained, and is one of the bases on which processing unit 9 operates, as described later on. Processing unit 9 therefore counts the number of pixels in the near-black portion, i.e. having a brightness level ranging from 0 to the value defined by T1, and determines whether the resulting total falls within a predetermined range indicating correct configuration of the end of cigarette 3. In the event of a missing hole 33 (FIG. 6a) or an anomalous opening 38 (FIG. 6b) in the end of cigarette 3, said total will indicate a smaller or greater number of pixels in the near-black portion respectively. Said processing unit 9 shifts area 35 progressively over the image of all the ends in group 2 and, in the event of a defect being detected, enables subsequent rejection of group 2 as described.

Operation of unit 9 will now be examined in detail with reference to FIG. 3.

Initial block 40 provides for determining stoppage of conveyor belt 6 and, in the event of a negative response, remains on hold. In the event of a positive response, however, block 40 goes on to block 41, which provides for temporarily enabling lighting units 13 and 13' for lighting the right-hand side of groups 2. Block 41 then goes on to block 42 which, via telecamera unit 10, provides for producing right-hand portion 32 of image 30 (FIG. 5a) of group 2, and for memorizing the same in a storage area 62 (buffer) on control system 8. Block 42 then goes on to block 43 which, via telecamera unit 11, provides for producing left-hand portion 31 of image 30 (FIG. 5a) of group 2 downstream from that of block 42, and for memorizing the same in a storage area 63 (buffer) on control system 8.

Block 43 then goes on to block 44, which temporarily enables lighting unit 14 and 14' for lighting the left-hand side of groups 2. Block 44 then goes on to block 45 which, via telecamera unit 10, provides for producing right-hand portion 32 of image 30 (FIG. 5a) of group 2, and for memorising the same in a storage area 64 (buffer) on control system 8. Block 45 then goes on to block 46 which, via telecamera unit 11, provides for producing left-hand portion 31 of image 30 (FIG. 5a) of group 2 downstream from that of block 45, and for memorising the same in a storage area 65 (buffer) on control system 8.

Block 46 then goes on to block 47, which provides for transferring the content of memory register 60 RGA into memory register 61 RGB (FIG. 1) on control system 8 (said content, as described in more detail later on, indicating the presence or absence of defects in the right-hand portion 32 of image 30 of group 2).

Block 47 then goes on to block 48, which provides for analysing said image portion 32 memorized in storage area 62. Operation of block 48, which is similar to that of blocks 50, 53 and 55 referred to later on, is shown in detail in FIG. 4. Initial block 70 provides for directing processing area 35 on to the image of one of the ends of cigarettes 3, in a predetermined scanning sequence covering all the ends in said portion 32. Block 70 then goes on to block 71 which, for said end marked by area 35, determines the brightness levels of the various pixels, for plotting curve 36 (FIG. 7) as already described.

Block 71 then goes on to block 72, which determines brightness value T1 corresponding to the minimum level to the left of curve 36, and which thus gives the brightness value range from 0 to T1 defining the near-black pixel portion, the total number of pixels in which is counted by block 73. This then goes on to block 74, which determines whether said total in block 73 falls within a given range. In the event of a negative response (indicating a defect in the end of cigarette 3), block 74 goes on to block 75 which sets indicator SC1 to 1 and then exits block 48. In the event of a positive response in block 74 (indicating substantially no defects in the end of cigarette 3), block 74 goes on to block 76 which determines whether area 35 was directed on to the last end in the scanning sequence of portion 32. In the event of a positive response, block 76 goes on to block 77 which sets indicator SC1 to 0 (indicating no defects in memorised image portion 32) and then exits block 48. In the event of a negative response in block 76, this goes back to block 70 which provides for directing area 35 on to the image of the next end of cigarette 3.

Block 48 (FIG. 3) then goes on to block 49, which determines whether SC1=1. In the event of a positive response (indicating a defect in image portion 32 produced by block 42 with illumination to the right of telecamera unit 10), block 49 goes directly to block 51 which enters the SC1 value into register 60 RGA. In the event of a negative reponse in block 49 (indicating substantially no defects in image portion 32 produced by block 42 with illumination to the right of telecamera unit 10), block 49 goes on to block 50 which, in the same way as block 48, analyses image portion 32 memorised in storage area 64 and produced by block 45 with illumination to the left of telecamera unit 10, so as to give an SC1 output value of 1 or 0 depending on whether any defects are detected. Block 50 then goes on to block 51 which memorises in register 60 RGA the SC1 value determined by block 48 and/or 50 and indicating the presence or absence of defects in right-hand image portion 32 produced with illumination to the right and left.

Block 51 then goes on to block 52, which determines whether the content of register 61 RGB equals 1 (said content having been transferred by block 47 from register 60 to 61, and therefore indicating the presence or absence of defects in right-hand image portion 32, illuminated to the right and left, of group 2 now facing telecamera unit 11, and which in the previous stage was facing telecamera unit 10, and the SC1 fault indicator of which was memorized in register 60 RGA by block 51). In the event of a positive response (defect detected), block 52 goes on to block 57 which provides for enabling expulsion unit 16 when compartment 4 containing said group 2 now facing telecamera 11 and containing at least one defective cigarette 3 in right-hand portion 32 is moved forward one step by conveyor 6 and arrested facing expulsion unit 16. In the event of a negative response (no defects in right-hand image portion 32), block 52 goes on to block 53 which, in the same way as block 48, analyses image portion 31 memorised in storage area 63 and produced by block 43 with illumination to the right of telecamera unit 11, so as to give an SC2 value of 1 or 0 at the output of block 53, depending on whether any defects are detected.

Block 53 then goes on to block 54 which determines whether SC2=1. In the event of a positive response (indicating the presence of said defects), block 54 goes directly to block 57 for subsequently enabling expulsion unit 16 as already described. In the event of a negative response (indicating substantially no defects), block 54 goes on to block 55 which, in the same way as block 48, analyzes image portion 31 memorized in storage area 65 and produced by block 46 with illumination to the left of telecamera unit 11, so as to give an SC2 value of 1 or 0 at the output of block 55, depending on whether any defects are detected. Block 55 then goes on to block 56 which determines whether SC2=1. In the event of a positive response (indicating the presence of defects in left-hand image portion 31 produced with illumination to the left), block 56 goes on to block 57 for subsequently enabling expulsion unit 16 as already described. In the event of a negative response in block 56 (indicating substantially no defects in the current analysis or, this being the last analysis, in any of cigarettes 3 in group 2), block 56, like block 57, goes back to block 40 to await the next stop of conveyor 6, upon which a further inspection cycle is repeated as described above.

The advantages of the inspection system according to the present invention will be clear from the foregoing description. Firstly, the ends of the cigarettes fed in groups on to the wrapping lines are so inspected as to enable a reliable evaluation of the surface configurations of the same in relation to predetermined reference configurations, and this with no need for sophisticated processing techniques or a particularly high-capacity electronic control unit. Inspection accuracy is further enhanced by employing two telecamera units, one each for a respective portion of group 2, and by operating each unit under two lighting conditions.

Another important feature is the self-regulating characteristic of the maximum brightness level of the near-black pixel portion, which varies as a function of various factors (wear of the light source, uneven light distribution, dust, etc.) which may impair illumination of the cigarette ends in group 2.

To those skilled in the art it will be clear that changes may be made to the number and arrangement of the telecamera units and light sources, to the type of cigarette being inspected, and to the operating sequence of the device implementing the system as described and illustrated herein without, however, departing from the scope of the present invention.

Figure 4:
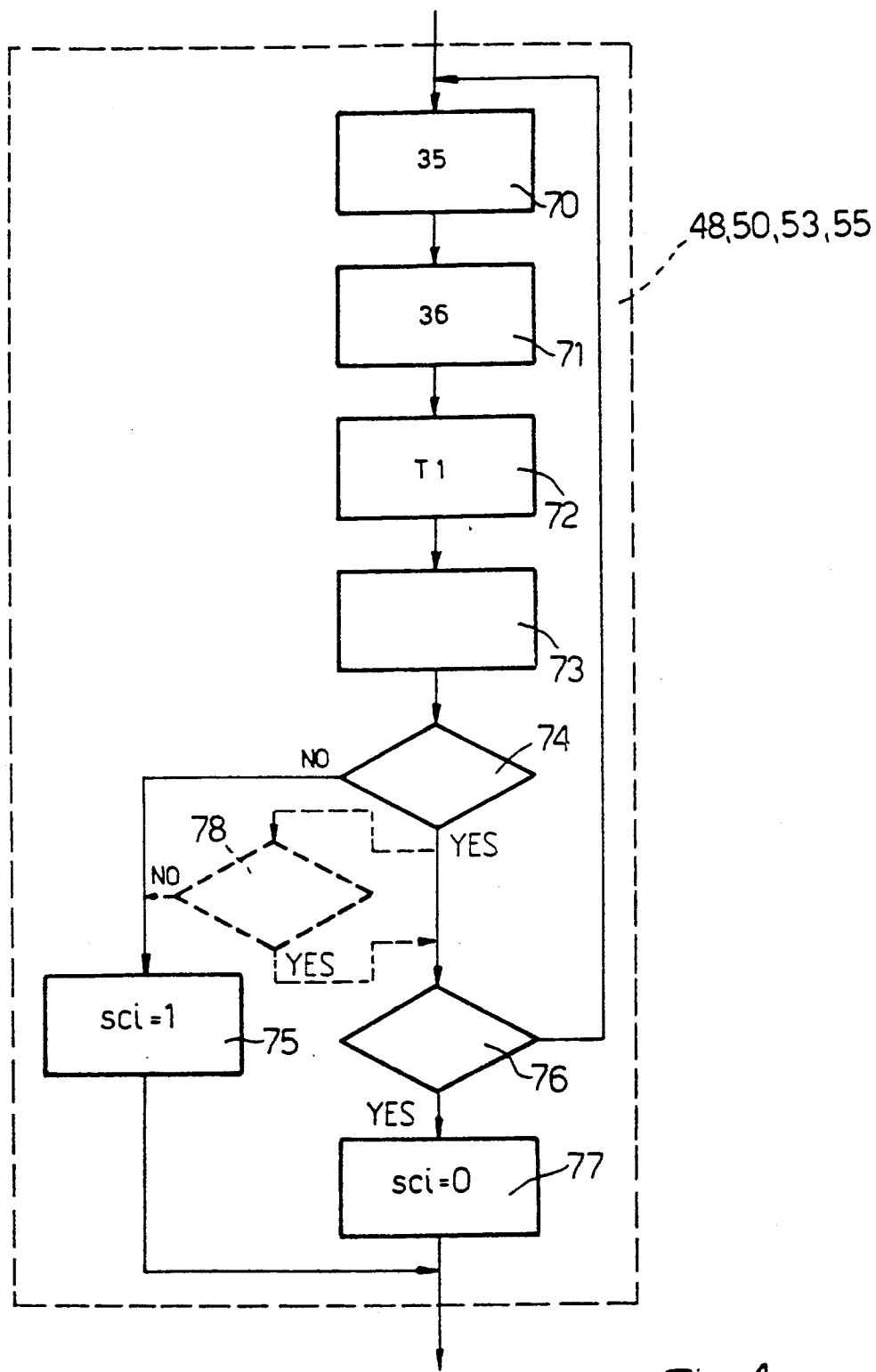
FIG. 4 shows a more detailed block diagram of one of the blocks in FIG. 3.

For example, as shown by the dotted line in FIG. 4, analysis block 48 (and also blocks 50, 53 and 55) may comprise, downstream from the positive output of block 74 determining whether the total number of pixels in the near-black portion falls within a given range, a further block 78 for determining whether the maximum Y axis value of said portion falls within a given range (Ll-Lh): in the event of a positive response (correct image), block 78 goes on to block 76, whereas, in the event of a negative response (defects detected in the image of the cigarette end), block 78 goes on to block 75 which enters SCi=1. Again with reference to said analysis block 48 (and equivalent blocks 50, 53 and 55), in addition to determining the brightness value of said first minimum level T1, block 72 may also provide for determining the brightness value of said second minimum level T2, so as to also determine the grey and near-white pixel portions, the total number of pixels of which is also counted by block 73. Block 74 may also determine whether said totals fall within predetermined ranges, and may go on to block 76 only in the event of a positive response relative to all the said pixel portions. Also, block 78, if any, may provide for determining whether the maximum Y axis values of said portions fall within predetermined ranges (Pl–Ph; Hl–Hh). Said values may, of course, be reset by the operator on control system 8 to adapt to changes in the characteristics of the type of cigarette being inspected.

Figure 8:
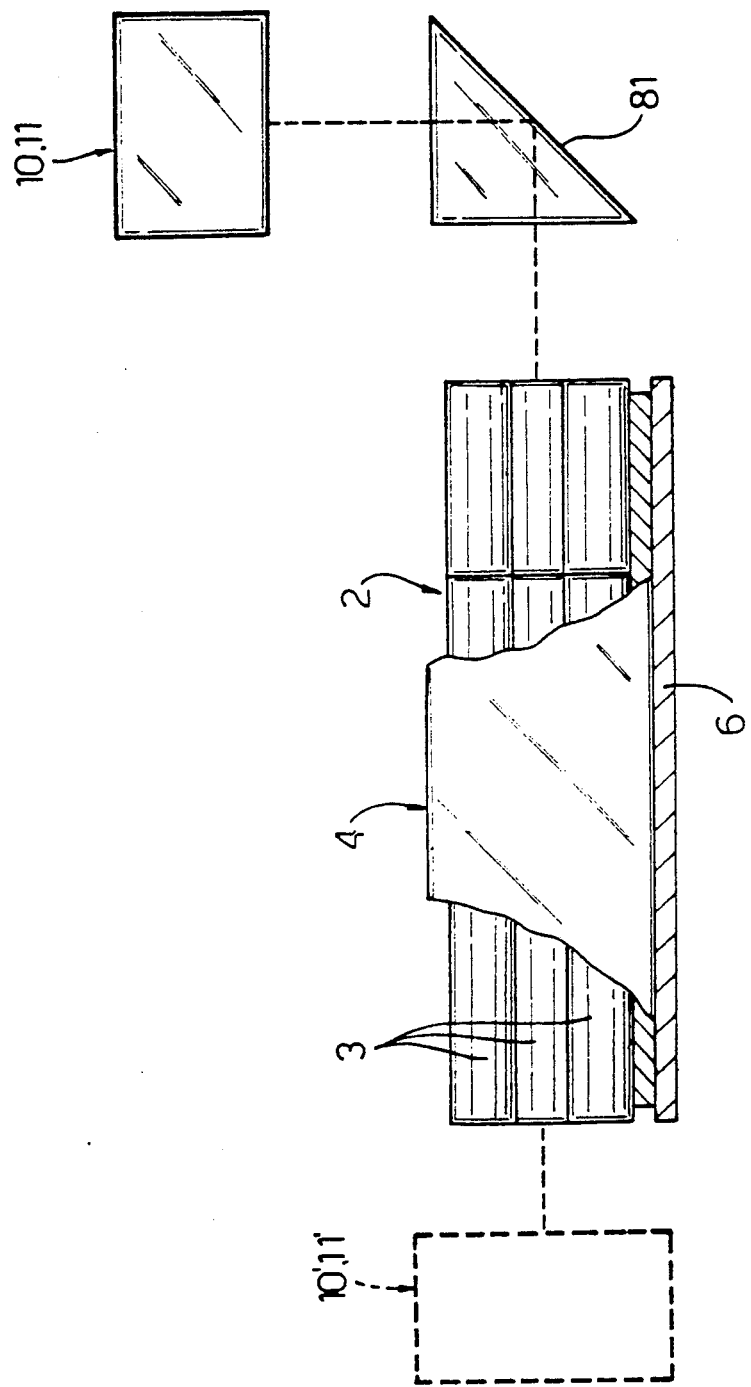
FIG. 8 shows a partially sectioned, schematic side view of a group of cigarettes, the ends of which are inspected via variations to the FIG. 1 device.

As shown in FIG. 8, should the space available to the side of conveyor 6 facing the ends of cigarettes 3 be insufficient for accommodating telecamera units 10 and 11, these may be raised and the image of the ends of cigarettes 3 in groups 2 produced using a prism 81 for deflecting the light rays 90°.

Similarly, an image may be produced of the other end of cigarettes 3, opposite the filter end, using similar telecamera units 10' and 11' for controlling, for example, correct tobacco fill, any defects of which are also manifested in differing near-black, grey, and near-white pixel portion totals.

I claim:

1. A system for inspecting the ends of cigarettes, comprising:
    first means for producing an image of at least an end surface of said cigarettes;
    second means for analysing said image to determine the brightness levels of elementary areas of said image;
    third means for comparing said brightness levels of said elementary areas determined by said second means with predetermined values to produce a signal indicating said cigarettes are to be rejected;
    fourth means for rejecting said cigarettes in response to said signal; and
    at least two light sources for lighting said end surface of said cigarettes from which said image is produced from different directions, said light sources are enabled alternatively and said first means produces an image of said end surface when each of said at least two light sources is enabled.

2. The system as claimed in claim 1, wherein said second means comprise means for calculating at least a total number of said portions of said image having a brightness level within a predetermined range.

3. The system as claimed in claim 2, characterized by the fact that said third means compare said total from said second means with a predetermined range of values.

4. The system as claimed in claim 2, characterized by the fact that said predetermined range comprises portions (pixels) of said image having brightness levels relatively close to black.

5. The system as claimed in claim 2, characterized by the fact that said second means comprise means for automatically calculating the limits of said predetermined range along with variations in the illumination of said surface from which said image is produced.

6. The system as claimed in claim 5, characterized by the fact that said means for automatically calculating the limits of said range determine the minimum values of a curve indicating the number of said portions as a function of the brightness levels.

7. The system as claimed in claim 1, characterized by the fact that said first means comprise at least a telecamera unit.

8. The system as claimed in claim 1, characterized by the fact that it comprises means for memorizing said respective images produced by said first means; said second means performing an analysis of said memorized images.

9. The system as claimed in claim 1,
    characterized by the fact that said group of cigarettes comprises a number of cigarettes suitable for packaging.

10. The system as claimed in claim 1, characterized by the fact that it comprises an electronic control system for controlling said first, said second, said third and said fourth means, and comprising a central processing unit.

11. A system as claimed in claim 1,
    characterized by the fact that said ends of said cigarettes present a number of longitudinal suction channels.

12. A device for transporting groups of cigarettes, characterized by the fact that it comprises a system for inspecting the ends of said cigarettes, as claimed in claim 1.

* * * * *